(12) United States Patent
Vierra

(10) Patent No.: US 10,304,445 B2
(45) Date of Patent: May 28, 2019

(54) WEARABLE DEVICE FOR SPEECH TRAINING

(71) Applicant: Viesoft, Inc., San Francisco, CA (US)

(72) Inventor: Anthony Vierra, San Francisco, CA (US)

(73) Assignee: Viesoft, Inc., Walnut Creek, CA (US)

( * ) Notice: Subject to any disclaimer, the term of this patent is extended or adjusted under 35 U.S.C. 154(b) by 27 days.

(21) Appl. No.: 15/292,748

(22) Filed: Oct. 13, 2016

(65) Prior Publication Data

US 2018/0108348 A1 Apr. 19, 2018

(51) Int. Cl.
| | |
|---|---|
| G10L 15/00 | (2013.01) |
| G10L 15/22 | (2006.01) |
| G09B 19/04 | (2006.01) |
| G10L 15/08 | (2006.01) |

(52) U.S. Cl.
CPC .............. G10L 15/22 (2013.01); G09B 19/04 (2013.01); *G10L 2015/088* (2013.01); *G10L 2015/223* (2013.01); *G10L 2015/225* (2013.01)

(58) Field of Classification Search
CPC ....................................................... G10L 15/00
USPC ...... 704/4, 277, 276, 250, 236, 235; 706/45, 706/12; 705/347, 14.67, 14.19, 14.12
See application file for complete search history.

(56) References Cited

U.S. PATENT DOCUMENTS

| | | | | |
|---|---|---|---|---|
| 6,233,557 B1 * | 5/2001 | Poppert | ................. | G10L 15/148 |
| | | | | 704/250 |
| 7,441,135 B1 * | 10/2008 | Chan | .................... | G06F 1/3203 |
| | | | | 713/320 |
| 8,008,563 B1 * | 8/2011 | Hastings | ............... | G09B 15/023 |
| | | | | 84/470 R |
| 8,694,537 B2 * | 4/2014 | Mohajer | ........... | G06F 17/30684 |
| | | | | 707/769 |
| 8,712,946 B1 * | 4/2014 | Heidenreich | ............ | G06N 5/04 |
| | | | | 706/45 |
| 2005/0033582 A1 * | 2/2005 | Gadd | ..................... | G06Q 30/02 |
| | | | | 704/277 |
| 2005/0049850 A1 * | 3/2005 | Porter | .................... | G04G 11/00 |
| | | | | 704/1 |

(Continued)

OTHER PUBLICATIONS

Hartmans, This tiny device can record everything you say and transcribe it for you, Feb. 7, 2017, 19 pages total, Retrieved from internet site http://www.businessinsider.com/senstone-kickstarter-record-everything-you-say-tanscribe-it-2017-2.

(Continued)

*Primary Examiner* — Michael C Colucci
(74) *Attorney, Agent, or Firm* — Brient IP Law, LLC

(57) ABSTRACT

A wearable utterance training system includes a wearable utterance training device. The system may, for example: (1) receive one or more target utterances from the user; (2) detect a use of one of the one or more target utterances by the user; and (3) in response, provide one or more responsive effects. The one or more responsive effects may include, for example: (1) providing one or more shocks to the user using the wearable utterance training device; (2) initiating a transfer of money between an account associated with the user and a third party account; (3) creating a public disclosure of the utterance (e.g., by posting the disclosure on one or more social media websites) and/or (4) playing a recording of the user's use of the target utterance or other sound.

19 Claims, 8 Drawing Sheets

(56) References Cited

U.S. PATENT DOCUMENTS

| | | | |
|---|---|---|---|
| 2007/0141541 A1* | 6/2007 | Chan | G09B 5/06 434/236 |
| 2008/0183678 A1* | 7/2008 | Weston | G06F 17/30699 |
| 2009/0091087 A1* | 4/2009 | Wasmund | A63F 9/18 273/430 |
| 2009/0210411 A1* | 8/2009 | Murata | G06F 17/30663 |
| 2010/0312555 A1* | 12/2010 | Plumpe | G10L 15/065 704/231 |
| 2011/0060587 A1* | 3/2011 | Phillips | G10L 15/30 704/235 |
| 2011/0099130 A1* | 4/2011 | Blumberg | G09B 5/00 706/12 |
| 2011/0106721 A1* | 5/2011 | Nickerson | G06Q 30/02 705/347 |
| 2012/0139828 A1* | 6/2012 | Lok | G09B 7/00 345/156 |
| 2013/0337889 A1* | 12/2013 | Gagner | G07F 17/3209 463/25 |
| 2014/0026048 A1* | 1/2014 | Spirer | G06F 3/0484 715/716 |
| 2014/0172432 A1* | 6/2014 | Sendai | G10L 21/10 704/276 |
| 2014/0229253 A1* | 8/2014 | Farrar, Jr. | G06F 17/30867 705/14.19 |
| 2014/0316779 A1* | 10/2014 | Russell | H04W 4/02 704/235 |
| 2014/0330563 A1* | 11/2014 | Faians | G06Q 30/0185 704/236 |
| 2015/0227954 A1* | 8/2015 | Jung | G06Q 30/0209 705/14.12 |
| 2016/0058336 A1* | 3/2016 | Blahnik | A61B 5/1112 600/595 |
| 2016/0125473 A1* | 5/2016 | Singh | G06Q 30/0271 705/14.67 |
| 2016/0135719 A1* | 5/2016 | von Kraus | A61B 90/36 600/559 |
| 2016/0182716 A1* | 6/2016 | Tatourian | H04M 3/436 455/413 |
| 2016/0322044 A1* | 11/2016 | Jung | G06F 3/017 |
| 2017/0140760 A1* | 5/2017 | Sachdev | G10L 17/04 |
| 2017/0316458 A1* | 11/2017 | Peretz | G06Q 30/0255 |

OTHER PUBLICATIONS

Microsoft, Speaker Recognition API Preview, Microsoft.com, Retrieved from Internet on May 15, 2017: https://www.microsoft.com/cognitive-services/en-us/speaker-recognition-api.

Microsoft, Cognitive Services, Microsoft.com, Retrieved from Internet on May 15, 2017: https://msdn.microsoft.com/en-us/library/mt612813.aspx.

Pavlok, Replace Bad Habits, pavlok.com, Retrieved from Internet on May 15, 2017: https://pavlok.com/?utm_expid=.flmEWv8XT5Sxl9JFSXfg_A.0&utm_referrer.

International Search Report, dated Dec. 7, 2017, from corresponding International Application No. PCT/US2017/056302.

Written Opinion of the International Searching Authority, dated Dec. 7, 2017, from corresponding International Application No. PCT/US2017/056302.

* cited by examiner

WEARABLE DEVICE FOR SPEECH TRAINING

BACKGROUND

Individuals may seek to refrain from or increase their use of particular utterances. Prior systems and methods have not addressed incentives or disincentives in connection with the use of particular target utterances. Thus, there is a need for improved systems and methods to provide responsive effects in connection with the use of the particular target utterances.

SUMMARY OF THE INVENTION

A wearable utterance training system, according to particular embodiments, comprises: (1) at least one processor and memory that stores a plurality of target utterances; and (2) a wearable utterance training device. In various embodiment's, the wearable utterance training device comprises: (1) a data collection device that comprises at least one microphone configured for capturing sound data; and (2) communication hardware for communicating the captured sound data to the at least one processor. In some embodiments, the at least one processor is configured for: (1) identifying one or more utterances of a user over a period of time; (2) comparing the one or more utterances of the user identified over the period of time to the plurality of target utterances; (3) determining that at least one of the one or more utterances of the user over the period of time is one of the plurality of target utterances stored in the processor memory; and (4) in response to determining that at least one of the one or more utterances of the user over the period of time is one of the plurality of target utterances stored in the processor memory, providing a responsive effect based on the at least one of the one or more utterances.

A non-transitory computer-readable medium, in various embodiments, stores computer executable instructions for: (1) obtaining, by an utterance training system that includes a computing device, one or more target utterances associated with a user, wherein the one or more target utterances are known to the user and the utterance training system includes at least a wearable device at least indirectly attached to the user and a processing device that is associated with the user and is in electronic communication with the wearable device, the wearable device being an electrical device; (2) storing, by the utterance training system, the one or more target utterances associated with the user; (3) monitoring, by the utterance training system that includes a microphone for capturing sound data, the user's utterances for a period of time; (4) determining, by the utterance training system, that at least one of the user's utterances during the period of time is one of the one or more target utterances; and (5) in response to determining that at least one of the user's utterances during the period of time is one of the one or more target utterances, causing, by the utterance training system, a responsive effect to occur based on one at least one of the user's utterances.

A computer implemented method, in various embodiments, comprises: (1) obtaining, by a utterance training system that is a computing device, one or more target utterances associated with a user, wherein the one or more target utterances are known to the user and the utterance training system includes at least a wearable device at least indirectly attached to the user and a processing device that is associated with the user and is in electronic communication with the wearable device, the wearable device being an electrical device; (2) storing, by the utterance training system, the one or more target utterances associated with the user; (3) continuously monitoring, by the utterance training system, the user's utterances for a period of time; (4) determining, by the utterance training system, that at least one of the user's utterances over the period of time is one of the one or more target utterances; and (5) in response to determining that at least one of the user's utterances over the period of time is one of the one or more target utterances, taking an action selected from a group consisting of: (a) initiating, by the utterance training system, a transfer of money between an account associated with the user and a third party account; (b) creating, by the utterance training system, a public disclosure to communicate information indicating that the user uttered one or more of the target utterances; and (c) playing, by the utterance training system, a sound.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

Various embodiments of utterance training computing systems and methods are described below. In the course of this description, reference will be made to the accompanying drawings, which are not necessarily drawn to scale and wherein.

DETAILED DESCRIPTION OF SOME EMBODIMENTS

Figure 1:
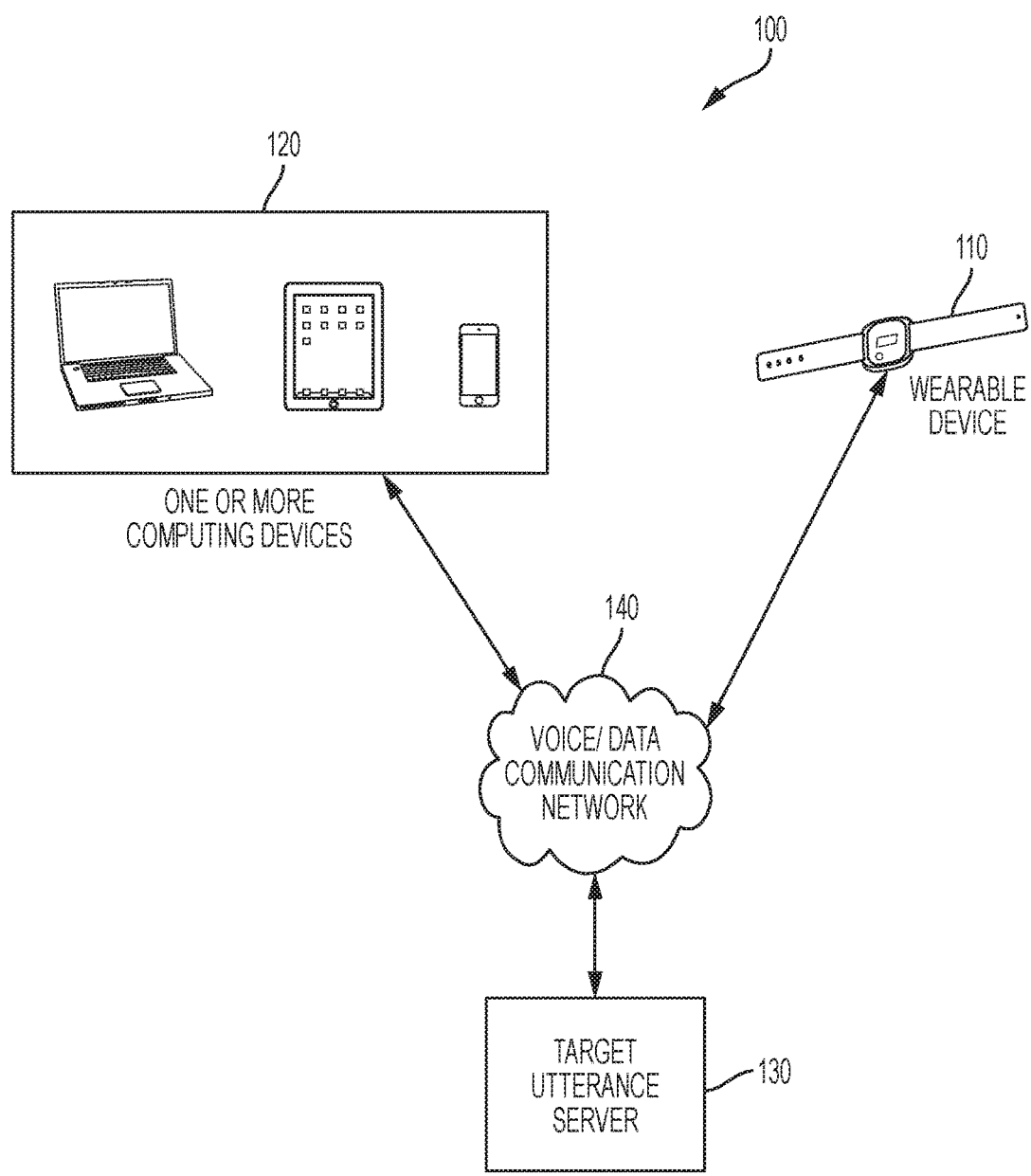
FIG. 1 is a block diagram of an Utterance Training System in accordance with an embodiment of the present system.

Various embodiments will now be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Utterance training systems and related methods, according to various embodiments, may provide one or more responsive effects in response to detecting the use of a particular target utterance by a user. The system may, for example: (1) receive one or more target utterances from the user; (2) detect a use of one of the one or more target utterances by the user; and (3) in response, provide one or more responsive effects. In various embodiments, the system is configured to detect the use of the one or more target utterances and provide the one or more responsive effects via a wearable utterance training device.

In particular embodiments, a wearable utterance training device may comprise, for example, a necklace, watch, bracelet, or any other suitable wearable device. In particular embodiments, the wearable utterance training device may include one or more microphones to detect the utterances that the user is saying (e.g., to monitor the speech of a user). For example, the user may desire to stop using particular swear words or a filled pause, such as "uh" or "um." The user or another can provide these target utterances to the utterance training system, and the system, in response to detecting the use of one of the target utterances, may determine whether it was the user that spoke the target utterance or a different person. The target utterance system may, for example, compare a recording of the user saying the target utterance to the detected use of the target utterance to determine if it was the user's voice (e.g., as opposed to the voice of another).

In response to the system determining that it was the user who made the target utterance, the system may provide one or more responsive effects. The one or more responsive effects may include, for example: (1) providing one or more shocks to the user using the wearable utterance training device; (2) initiating a transfer of money between an account associated with the user and a third party account (e.g., automatically make a charitable donation on behalf of the user); (3) creating a public disclosure to communicate information indicating that the user uttered one or more of the target utterances (e.g., by posting the disclosure on one or more social media web sites, transmitting a message to one or more other people known to the user, etc.); and/or (4) play a recording of the user's use of the target utterance. In various embodiments, the utterance training system may provide one or more positive responsive effects to incentivize the user to use particular words. For example, the user or another may create the one or more target utterances to include different types of complimentary or polite words, one or more advanced vocabulary words, one or more words in a foreign language (e.g., to promote practice when a user is learning a foreign language), etc. In this scenario, the one or more responsive effects may include, for example: (1) providing a massage or vibration to the user via the wearable utterance training device; (2) transferring of money into the user's account from a third party account; (3) etc. By providing these responsive effects in response to the user using the target utterances, the system and method may help prevent or promote, as defined by the user, particular target utterances.

Exemplary Technical Platforms

As will be appreciated by one skilled in the relevant field, the present systems and methods may be, for example, embodied as a computer system, a method, or a computer program product. Accordingly, various embodiments may be entirely hardware or a combination of hardware and software. Furthermore, particular embodiments may take the form of a computer program product stored on a computer-readable storage medium having computer-readable instructions (e.g., software) embodied in the storage medium. Various embodiments may also take the form of Internet-implemented computer software. Any suitable computer-readable storage medium may be utilized including, for example, hard disks, thumb drives, compact disks, DVDs, optical storage devices, and/or magnetic storage devices.

Various embodiments are described below with reference to block diagram and flowchart illustrations of methods, apparatuses, (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, a special purpose computer, or other programmable data processing apparatus that can direct a computer or other programmable data processing apparatus to function in a particular manner such that the instructions stored in the computer-readable memory produce an article of manufacture that is configured for implementing the functions specified in the flowchart block or blocks.

The computer instructions may execute entirely on the user's computer, partly on the user's computer, as a stand-alone software package, partly on a user's computer and partly on a remote computer, or entirely on the remote computer or server. The remote computer may be connected to the user's computer through any suitable type of network, including but not limited to: (1) a local area network (LAN); (2) a wide area network (WAN); and/or (3) a cellular network. It should be understood that a particular computer's connection to the network may be made via an external computer (for example, by connecting to the internet via a "hotspot" provided by a portable wireless device).

The computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer-implemented process (e.g., method) such that the instructions that execute on the computer or other programmable apparatus provide steps for implementing the functions specified in the flowchart block or blocks.

Example System Architecture

FIG. 1 is a block diagram of an utterance training system 100 according to particular embodiments. As may be understood from this figure, the utterance training system 100, in particular embodiments, includes: (1) a wearable device 110, that may, for example, include hardware and/or software that facilitates monitoring sound data (e.g., a user's speech), stores information, and provides electrical, vibrating, or sound stimulation; (2) one or more portable computing devices 120, which may, for example, include one or more cellular phones (e.g., a smartphone or traditional cellular phone), tablet computers, and/or laptop computers; and (3) a target utterance server 130 that may, for example, be remote from the one or more computing devices 120. The wearable device 110, one or more portable computing devices 120, and/or the target utterance server 130 may include memory that stores target utterance information for one or more users, as further described below.

The system may further include one or more voice and/or data communication networks 140 for initiating and/or mediating communication between the various system components discussed above. These one or more networks 140 may include any of a variety of types of wired or wireless computer networks such as the Internet (or other WAN), Local Area Network (or WLAN), a private intranet, a mesh network, a public switch telephone network (PSTN), or any other type of network (e.g., a network that uses Bluetooth (standard or low energy Bluetooth), beacon communication technologies (e.g., iBeacon), Zigbee, Zwave, RFID and/or near field communications to facilitate communication between computing devices).

Figure 2:
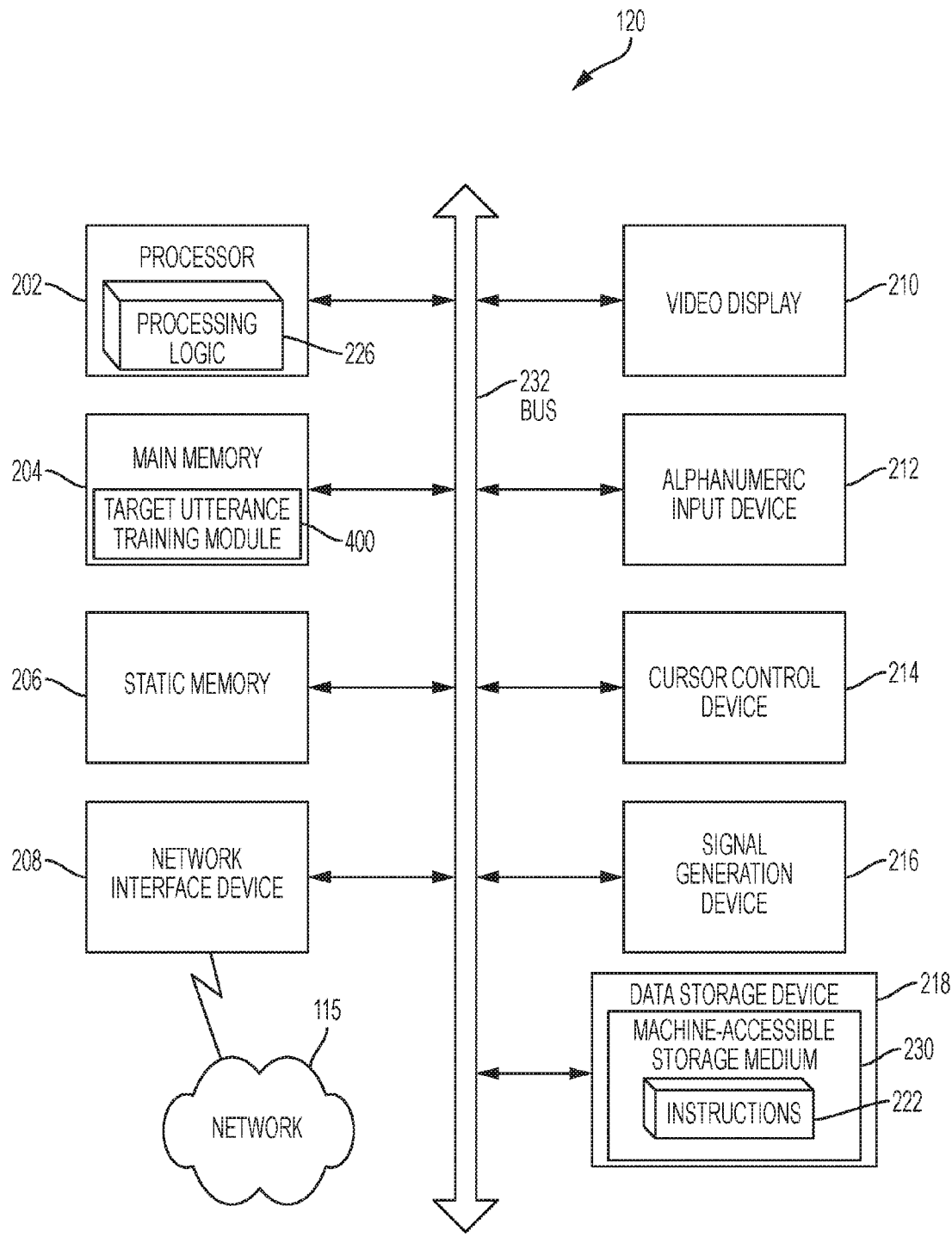
FIG. 2 is a block diagram of the Target Utterance Server of FIG. 1.

FIG. 2 illustrates an exemplary diagrammatic representation of the architecture of a target utterance server 130 that may be used within the utterance training system 100. It should be understood that the computer architecture shown in FIG. 2 may also represent the computer architecture of any one of the one or more portable computing devices 120 and/or the wearable device 110 that are shown in FIG. 1.

In particular embodiments, the target utterance server 130 may be connected (e.g., networked) to other computing devices in a LAN, an intranet, an extranet, and/or the Internet or other suitable network as shown in FIG. 1. As noted above, the target utterance server 130 may operate in the capacity of a server or a client computing device in a client-server network environment, or as a peer computing device in a peer-to-peer (or distributed) network environment. The target utterance server 130 may be a desktop personal computing device (PC), a tablet PC, a set-top box (STB), a Personal Digital Assistant (PDA), a cellular telephone, a web appliance, a network router, a switch or bridge, a physical computer server, a cloud-based logical computer server and/or any other computing device capable of executing a set of instructions (sequential or otherwise) that specify actions to be taken by that computing device. Further, while only a single computing device is illustrated, the single term "computing device" (or other such singular terminology referring to a computing device) should also be interpreted to include any collection of computing devices that individually or jointly execute a set (or multiple sets) of instructions to perform any one or more of the methodologies discussed herein.

As shown in FIG. 2, an exemplary target utterance server 130 includes a processor 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other and other system components via a bus 232.

The processor 202 represents one or more general-purpose or specific processing devices such as a microprocessor, a central processing unit (CPU), or the like. More particularly, the processor 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processor 202 may be configured to execute processing logic 226 for performing various operations and steps discussed herein.

The target utterance server 130 may further include a network interface device 208. The target utterance server 130 may also include a video display unit 210 (e.g., a liquid crystal display (LCD) or a cathode ray tube (CRT)), an alpha-numeric input device 212 (e.g., a keyboard), a cursor control device 214 (e.g., a mouse), and a signal generation device 216 (e.g., a speaker).

The data storage device 218 may include a non-transitory computer readable storage medium 230 (also known as a non-transitory computer-readable medium) on which is stored one or more sets of instructions (e.g., the utterance training module 400) embodying any one or more of the methodologies or functions described herein. The utterance training module 400 may also reside, completely or at least partially, within the main memory 204 and/or within the processor 202 during execution thereof by the target utterance server 130—the main memory 204 and the processing device 202 also constituting non-transitory computer-readable storage media. The utterance training module 400 may further be transmitted or received over a network 60 via a network interface device 208.

The network 140 although illustrated as one "cloud" for the sake of brevity and ease of understanding should be understood to include one or more LANs, one or more virtual LANs, the Internet, one or more extranets, one or more WANs and/or other any other suitable networking topologies that facilitate the movement of data from one computing device to another. As is commonly understood in the art, each of the aforementioned networks may or may not have the ability to communicate directly with each other. By way of one example, data that is destined for the computing device 120 may traverse the public Internet but once received, may then be communicated (e.g., along with other data derived from the original data) via a private LAN to the wearable device 110.

While the computing device-accessible storage medium 230 is shown in an exemplary embodiment to be a single medium, the term "computer readable medium" should be understood to include a single medium or multiple media (e.g., a centralized or distributed database, and/or associated caches and servers) that store the one or more sets of instructions. The terms "computing device-accessible storage medium" or "computer-readable medium" should also be understood to include any medium that is capable of storing, encoding, or carrying a set of instructions for execution by the computing device and that may, for example, cause the computing device to execute any one or more of the methodologies of the present invention. The terms "computing device-accessible storage medium" and "computer-readable medium" should accordingly be understood to include, but not be limited to, solid-state memories, optical and magnetic media, etc.

Exemplary Hardware System

Figure 3:
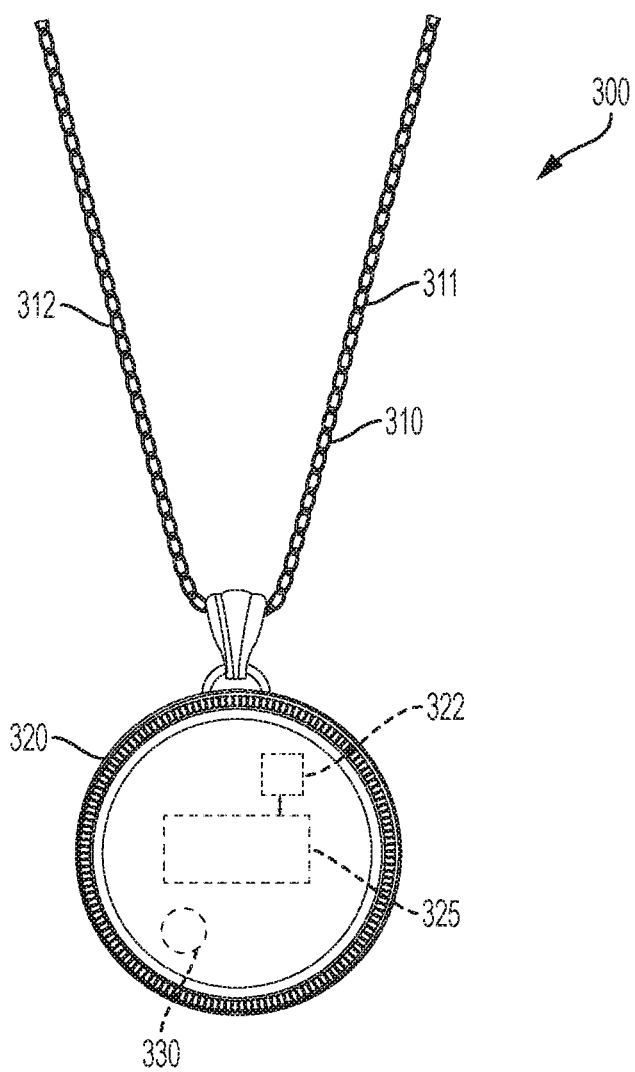
FIG. 3 is a front view of an utterance training device according to a particular embodiment.

FIG. 3 is a front view of an exemplary wearable utterance training device 300. In some implementations, the wearable utterance training device 300 may be, or include portions of, one or more of the wearable device 110, portable computing device 120, and target utterance server 130. In the embodiment shown in this figure, the wearable utterance training device 300 includes an elongated band 310 that includes a first end 311 and a second end 312. The elongated band 310 may be a wearable accessory, such as a necklace, a bracelet, a watch, a slap bracelet, a belt, a headband, an earring, a ring, a clasp, or a skin clamp, among others. In particular embodiments, the first end 311 and the second end 312 are configured to be connected around a part of the user (e.g., around the user's neck for a necklace or around the user's wrist for a bracelet). The first end 311 and second end 312 may be connected in any manner known in the field, and may include, for example, a clasp, clip, adhesive, hook and loop fasteners, or any other type of fastener. In some implements, the elongated band 310 may be configured to be enclosed prior to application on the user's (e.g., a headband).

In the embodiment shown in FIG. 3, the wearable utterance training device 300 also includes one or more data collection devices 320 that include one or more microphones 322 configured to capture sound data. The one or more data collection devices 320 may also include a processor, memory, and other components, as described above with respect to FIG. 2. Power may be provided to any component of the wearable utterance training device 300 by the use of a battery, or in some implementation, the wearable utterance training device 300 may receive power by a plug-in power supply. The data collection device 320 is connected, directly or indirectly, to the elongated band 310 by a clasp, adhesive, clip, or fastener. The one or more microphone 322 may capture sound data, for example, when the wearable utterance training device 300 is activated or electrically turned on. In other embodiments, the one or more microphone 322 may be configured to substantially continuously (e.g., continuously) monitor a user's speech.

In various embodiments, the wearable utterance training device 300 also includes communication hardware 325 that enables the wearable utterance training device 300 to transmit signals over a communication network. For example, the communication hardware may be network interface device 208, as described above in FIG. 2, or other type of communication hardware. Communication hardware 325 may be a part of the data collection device 320, connected to the data collection device 320, or separate from the data collection device 320. The communication hardware 325 may use communication network 140 to relay the received sound data obtained by the data collection device 320 to a processor at the portable computing device 120, target utterance server 130, or other component. In some embodiments, the processor may be located within the wearable utterance training device 300. In particular embodiments, the communication hardware 325 includes one or more antennae.

In response to the processor receiving the sound data, the processor is configured to identify utterances that the user uttered over a period of time (e.g., since the last time sound data was transmitted to the processor, over the last hour, day, week, or other time period). The processor can determine that particular utterances were provided by the user based on using voice recognition software or other methods. The processor may then compare the one or more utterances of the user identified over the period of time to a plurality of target utterances stored in the processor memory. For example, the user may have provided particular target utterances to a part of the utterance training system 100, and that information may be accessible by the processor for the comparison. The processor may then determine that at least one of the one or more utterances of the user over the period of time is one of the plurality of target utterances stored in the processor memory, and in response, provide, a responsive effect. The processor may track a number of times the user's utterances include one of the target utterances and store that information in the processor's memory.

The responsive effect may be a negative or positive responsive effect depending on whether the target utterance provided by the user is an utterance the user is seeking to increase or decrease the frequency of. The responsive effect may be provided by the wearable utterance training device 300 or a different computer system that may be, for example, the portable computing device 120 or target utterance server 130, as further described below. The one or more responsive effects may include, for example: (1) providing a shock to the user through a stimulus component 330 of the wearable utterance training device; (2) initiating a transfer of money between an account associated with the user and a third party account; (3) creating a public disclosure to communicate information indicating that the user uttered one or more of the target utterances; (4) playing a recording of the user's use of the target utterance; and/or (5) any other suitable responsive effect.

If the responsive effect is to be a positive effect, then the responsive effect may include, for example, (1) providing a massage or vibration to the user via the wearable utterance training device; (2) transferring of money into the user's account from a third party account; (3) etc. In various embodiments transferring money from the user's account to a third party account may include, for example, transferring the money to a charity or other charitable organization, transfer the money to the user's savings account from a checking account, transferring the money to a college savings or other account for a friend or relative of the user, etc. These responsive effects, and others, will be further described below. The stimulus component 330 may be connected to or a part of the data collection device 320 or other portion of the wearable utterance training device 300, or may not be connected to the wearable utterance training device 300.

Operation of Exemplary System

As noted above, an utterance training system 100, according to various embodiments, is adapted to determine the use (e.g., speech) by the user of a target utterance, and providing a responsive effect based on determining the use of the target utterance.

Figure 4:
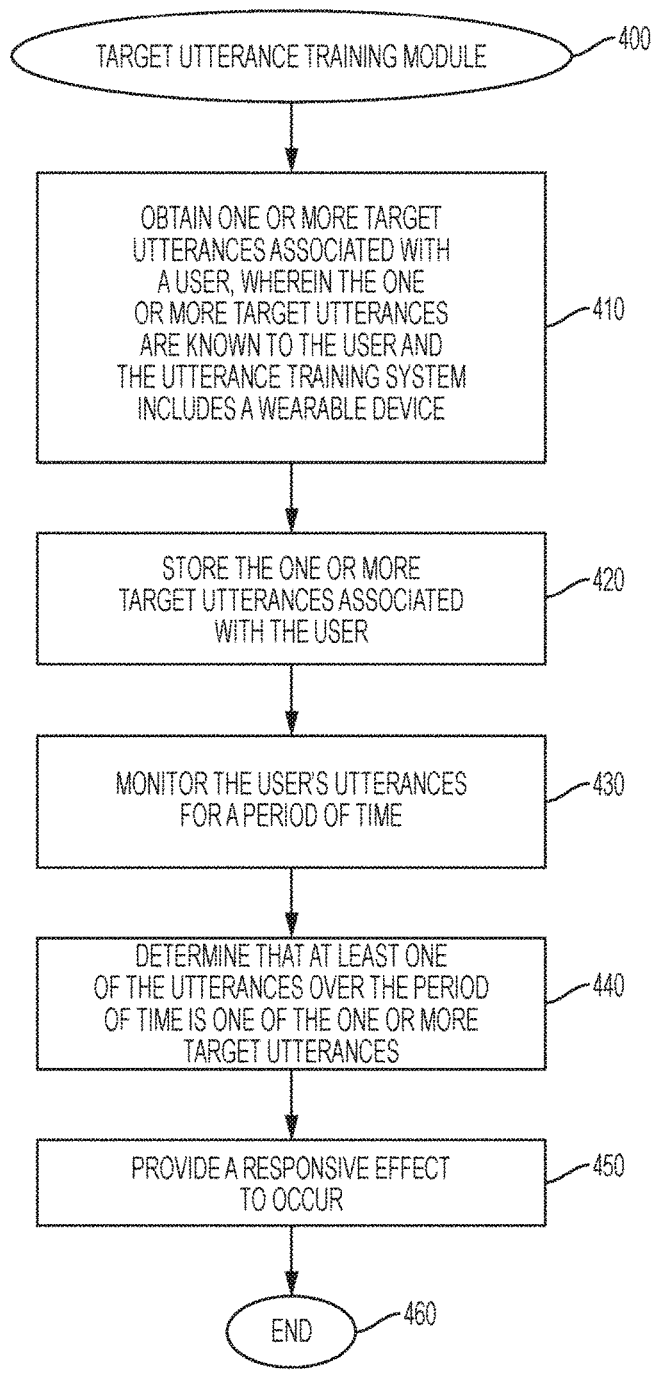
FIG. 4 is a flowchart that generally illustrates various steps executed by an Utterance Training Module according to a particular embodiment.

FIG. 4 is a flow chart of operations performed by an exemplary target utterance training module 400 according to a particular embodiment. As may be understood by one skilled in the art, various embodiments of the system described herein may omit certain of the operations described below with respect to various flow charts, perform the operations in an order other than those presented, or perform operations in addition to those described. Various of the operations described may be performed by any suitable component of the system (e.g., such as any component described above with respect to FIGS. 1, 2 and 3), and any system component may be configured to perform then.

Turning to FIG. 4, the system begins, at Step 410, by obtaining one or more target utterances associated with a user. As described above, the one or more target utterance may include words or other utterances that the user would like, or is being required, to say less frequently or not at all. For example, the user may be seeking to stop using particular swear words or filled pauses, such as "uh" or "um." Also, the target utterances may be words or other utterances that the user is seeking to say more. For example, user or another can create the target utterances to be different types of complimentary or polite words or advanced vocabulary words. As a particular example, a user trying to learn a new vocabulary word in any language may provide the system with the new vocabulary word as a target utterance that the user would like to use within a certain time frame (e.g., a user may desire to use a new vocabulary word every day).

A user or another may provide the one or more target utterances to the target utterance server 130 (e.g., using a software application or other suitable user interface). These one or more target utterances may be provided directly to the target utterance server 130 or another component of the utterance training system 100, such as the wearable device 110 or a portable computing device 120. For example, the user may input a particular target utterance by providing a spelling of the target utterance, speaking the target utterance into one or more microphones). The user may identify whether each target utterance is an utterance that should have a positive or negative responsive effect, as further described below. The wearable device 110 and portable computing device 120 may communicate with the target utterance server 130, or one another, via network 140, as described above.

In various embodiments, the wearable device 110 is configured to be attached to the user (e.g., around the user's neck, wrist, pinned to the user, or connected to an accessory of the user). In particular embodiments, the wearable device 110 comprises a necklace, a bracelet, a slap bracelet, a belt, a headband, an earring, a ring, a clasp, a skin clamp, or any other suitable wearable device. The wearable device 110 is at least in electronic communication with a processing device, which may be a component of the wearable device 110 itself or a portable computing device 120 (e.g., a smart phone of the user). The electrical communication may be a wired connection within wearable device 110, or may also be communication over network 40. In some implements, wearable device 110 may be the wearable utterance training device 300, or include similar components. Additionally, the wearable device 110 may include a stimulus component that is similar to stimulus component 330.

In particular embodiments, the user may provide the target utterances by speaking each of the target utterances into a microphone of a component of the utterance training system 100, such as the wearable device 110 or portable computing device 120. The microphone may capture the sound data, and the system may user the captured sound data to create an acoustic profile for each of the target utterances provided by the user. In some implementations, the user knows the target utterances they are providing, and may provide the target utterances by inputting text to spell or otherwise identify the target utterance when prompted. The text input may be provided by use of a keyboard, keyboard interface, cursor, mouse, or other type of selection on the wearable device 110, portable computer 120, or other component of the utterance training system 100. For example, the user may provide each target utterance by use of a keyboard (or keyboard interface) on the portable computer 120 of the user.

Additionally, in some implementations, the target utterance system 100 may provide selection options to the user at an interface (e.g., a display portion of a portable computer 120) where the user can select the target utterances from a list or other displayed collection. The target utterance system 100, for example, at the target utterance server 130, may have a collection of target utterances that can be provided to the user for selection. This collection may be based on target utterances that other users have input to the target utterance system 100 for themselves, information that the target utterance system 100 has about the user (e.g., age, location, among others), or default target utterances stored in the target utterance system 100 (e.g., from a dictionary or other suitable source).

Continuing to step 420, the one or more target utterances provided or selected by the user, or another, are stored. The target utterances may be stored at the target utterance server 130 or in another component of the target utterance system 100. For example, the target utterances may be stored in the portable computer 120 of the user, or in a storage component of the wearable device 110. Additionally, in some implementations, at least a portion of the target utterance server 130 may be stored on one of the wearable device 110 or portable computer 120. In particular embodiment's, the one or more target utterances are stored in memory associated with any suitable system component described herein.

In particular embodiments, the target utterances are stored for the specific user, and the target utterances may be associated with a user profile of the user. The user profile may also include an identification of the one or more wearable devices 110 of the user and the one or more portable computers 120 of the user. Information for the user profile, including a setting of the target utterances, may be accessed by the user on a portable computer 120 (e.g., via an internet web browser or a software application). In some embodiments, the system is configured to enable the user to add, change, or delete information from the user profile. For example, the user may change the target utterances by adding or deleting particular target utterances, or the user can change, by adding or deleting, wearable devices 110 or portable computers 120 associated with the user (e.g., when the user gets a new portable computer or gives away a portable computer 120).

At step 430, the utterance training system 100 monitors the user's utterances for a period of time. The user may activate the utterance training system 100 to monitor or the user may apply certain parameters for when the utterance training system 100 is to monitor. The parameters may include, for example, particular days or times of day, a location or type of location of the user (e.g., at home), randomly activate the monitoring, among others. The period of time may be a set period (e.g., one minute) or varied period (e.g., when the device that is monitoring the sound data obtains Wi-Fi access). In various embodiments, the utterance training system 100 includes one or more microphones that capture sound data of the user's utterances in the period of time. For example, the wearable device 110 may include a microphone and store the captured sound data, or transmit the captured sound data to the portable computer 120 of the user or the target utterance server 130. In some implementations, a portable computer 120 includes a microphone that captures the sound data of the user's utterances during the time period. The captured sound data may be either pushed or pulled to the desired destination of the sound data for storage and analysis. In various embodiments, the one or more microphones are configured to continuously monitor the user's speech during the period of time indicated by the user.

The system, in various embodiments, may analyze the sound data at the target utterance server 130 or in a component of the user's portable computer 120. In some embodiments, the utterance training system 100 determines that the captured sound data is an utterance provided by the user, and then the utterance training system 100 converts the captured sound data to text, for example, using speech-to-text software in order to convert the captured sound data to text. In some implementations, an acoustic profile is created for the captured sound data in order to compare the created acoustic profiles or the captured sound data to the acoustic profile of the target utterances that were provided by the user. The utterance training system 100 may compare the sound data that was captured during the period of time to a stored sample of the user's voice in order to determine whether an utterance that is provided in the sound data is an utterance that was provided by the user. If the utterance training system 100 determines that the utterance in the sound data was not provided by the user, then the utterance training system 100 disregards that portion of the sound data for future analysis.

At step 440, the utterance training system 100 determines that an utterance provided by the user is one of the target utterances. In the analysis, the utterance training system 100 may compare the text of each utterance provided by the user in the certain time period to the text of each of the target utterances identified by the user. In some implementations, the utterance training system 100 may compare the acoustic profile of each utterance provided by the user in the certain time period to the acoustic profile of each of the target utterances identified by the user. In making this comparison, the system may use an analysis to map the sound waves and other sound data that is part of each acoustic profile, and the utterance training system 100 may use any type of audio comparison software to perform the analysis.

At step 450, the utterance training system 100 provides a responsive effect to occur based on determining that an utterance provided by the user is one of the target utterances. The responsive effect may be a negative or positive responsive effect depending on whether the target utterance provided by the user is an utterance the frequency of which the user is seeking to increase or decrease. As previously described, the user may select, for each target utterance, whether the responsive effect is to be positive or negative. The system, in various embodiments, is configured to provide the responsive effect via the wearable device 110 or a different computer system that may be, for example, the portable computing device 120 or target utterance server 130, as further described below.

In particular embodiments, the system provides the responsive effect by, for example: (1) providing a shock to the user through a stimulus component of the wearable device 110; (2) initiating a transfer of money between an account associated with the user and a third party account (e.g., a friend or supervisor of the user); (3) creating a public disclosure to communicate information indicating that the user uttered one or more of the target utterances (e.g., by automatically creating a social media post indicating that the user said the particular target utterance, as further described below with respect to FIG. 8); (4) playing a recording of the user's use of the target utterance (e.g., on the wearable device 110 or a portable computer 120 of the user) or playing any other suitable sound (e.g., a beep, horn, siren, etc. in a loud manner to embarrass the user) and/or (5) taking any other suitable action to provide any suitable responsive effect. Additionally, in some implementations, the system enables the user to customize the responsive effect that is provided, and the user may use any component of the target utterance system 100 to provide the responsive effect or initiate the responsive effect outside of the target utterance system 100.

In embodiments in which the responsive effect is a positive effect, then the responsive may include, for example: (1) providing a massage or vibration to the user via the wearable device 110; (2) a transfer of money into the user's account from a third party account, among others; (3) creating a public disclosure to communicate information indicating that the user uttered one or more of the target utterances (e.g., automatically creating a social media post indicating that the user said the particular target utterance, as further described below with respect to FIG. 8), or playing a recording of the user's use of the target utterance (e.g., on the wearable device 110 or a portable computer 120 of the user).

In particular embodiments, the system is configured to provide the responsive effect substantially immediately in response to the user stating an utterance that is one of the target utterances. In other embodiments, the system is configured to provide the responsive effect at a later time. At step 460, the process ends.

Figure 5:
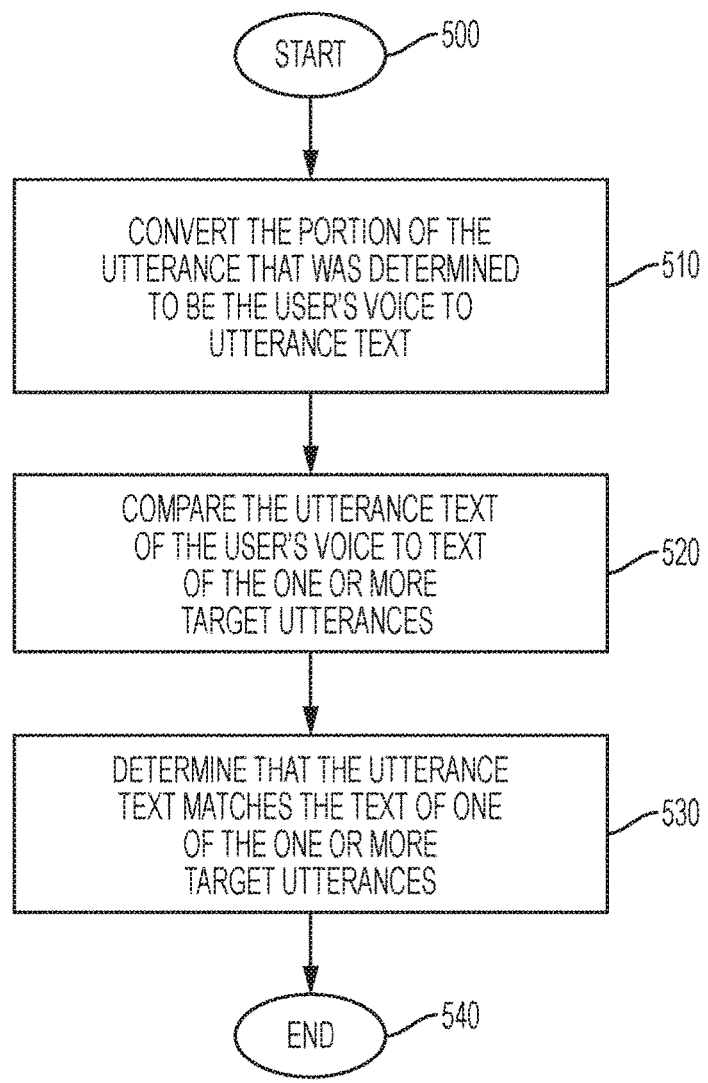
FIG. 5 is a flowchart that generally illustrates various steps executed by the Utterance Training Module to determine the use by the user of a target utterance, according to a particular embodiment.

Turning to FIG. 5, it displays a flowchart that generally illustrates various steps executed by the utterance training module 400 to determine the use by the user of a target utterance, according to a particular embodiment. The process begins at step 510, by converting the portion of the utterance that was determined to be the user's voice to utterance text. As previously described, this may be performed by using speech-to-text software in order to convert the captured sound data to text.

At step 520, the system compares the converted text that transcribes the user's utterance text to text of each of the target utterances. The system may perform this comparison using the target utterance server 130 or another component of the utterance training system 100, such as the wearable device 110 or a portable computing device 120. In other embodiments, the system may perform this comparison using any type of text comparison software. In some implementations, when the user has identified a target utterance that does not have an identified spelling (e.g., slang terms), the user may provide the spelling and speak the word to the target utterance system 100 in order to provide the correct mapping between the way a word sounds and its spelling for later use by the system in identifying target utterances. For example, the user may identify the slang term, "wuz up" as a target utterance. In response to the system identifying this utterance as a target utterance, the user may provide the spelling of that term as well as speak the utterance in order to provide the mapping.

At step 530, in response to the target utterance system 100 comparing the utterance text to the text of target utterances, the system may determine that the utterance text matches the text of the one or more target utterances. In some implementations, the target utterance system 100 may include a level of confidence associated with the matching between the utterance text and the text of target key words. The level of confidence may be provided in a similarity score between the text of the target utterances and the utterance text. For example, the similarity score may be a similarity between the number of letters that are the same and at the same position on the text. Upon determining that the utterance text sufficiently matches the text of the one or more target utterances, the target utterance system 100 may provide a response effect, as described above.

Figure 6:
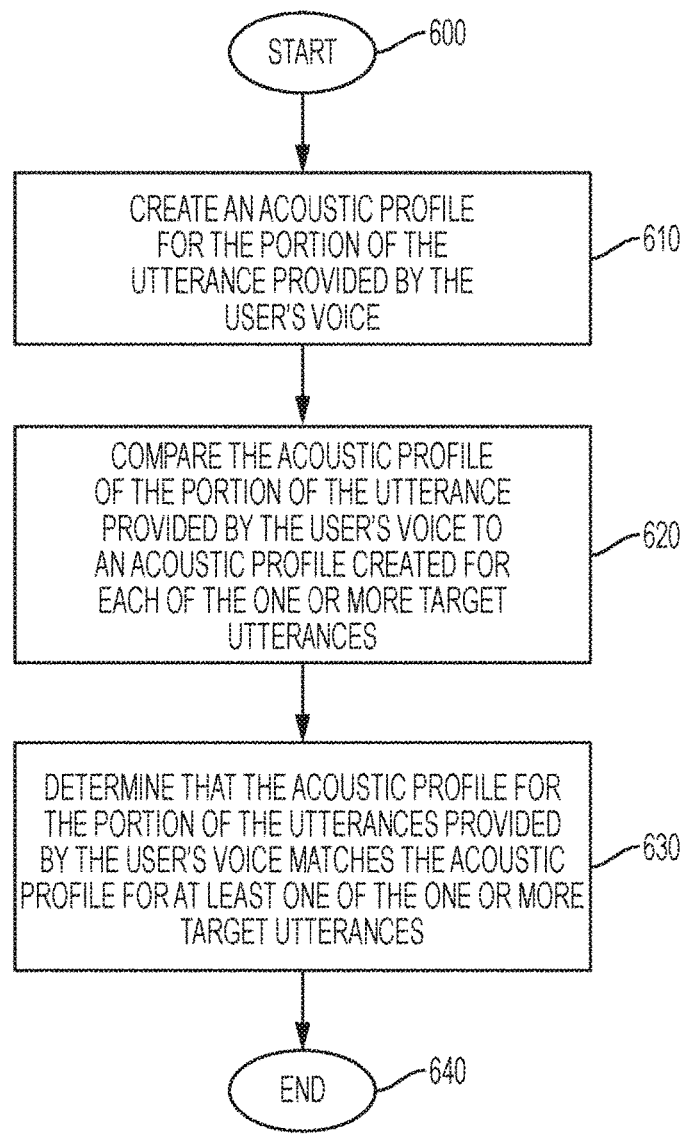
FIG. 6 is a flowchart that generally illustrates various steps executed by the Utterance Training Module to provide an analysis of an acoustic profile of a user, according to a particular embodiment.

FIG. 6 is a flowchart that generally illustrates various steps executed by the utterance training module 400 to provide an analysis of an acoustic profile of a user, according to a particular embodiment. The process begins at step 610 by creating an acoustic profile for the portion of the utterance provided by the user's voice. The acoustic profile may include the sound data for each utterance provided by the user's voice. As previously described, the utterance training system 100 may use voice recognition software to detect the user's voice, or any other method to detect the user's voice. For example, the utterance training system 100 may detect the user's voice by identifying the voice that is closest to the microphone that is part of the wearable device 110 or the portable computer 120 of the user. Additionally, the acoustic profile for each utterance of the user may include sound wave data or any other identifier of the utterance.

At step 620, the utterance training system 110 compares the acoustic profile for the portion of the utterance provided by the user's voice to an acoustic profile for each of the one or more target utterances. At the time of the user identifying and providing each target utterance, an acoustic profile may be created for that utterance. This acoustic profile may be stored in the target utterance server 130 or another component of the utterance training system 100, such as the wearable device 110 or a portable computing device 120. The acoustic profile for each target utterance may include the same information that is part of the acoustic profile for each utterance provided by the user's voice discussed in step 610.

At step 630, in response to the target utterance system 100 comparing the acoustic profile for the portion of the utterance provided by the user's voice to an acoustic profile for each of the one or more target utterances, the system may determine that the acoustic profile for the portion of the utterance provided by the user's voice matches the acoustic profile for at least one of the one or more target utterances. In some implementations, the target utterance system 100 may have a level of confidence associated with the matching between the acoustic profile for the utterance provided by the user's voice and the acoustic profile for at least one of the target utterances. The level of confidence may be provided in a similarity score, as described below with respect to FIG. 7.

In response to determining that the acoustic profile for the portion of the utterance provided by the user's voice matches the acoustic profile for at least one of the one or more target utterances, the target utterance system 100 may provide a response effect, as described above. If the system determines that the acoustic profile for the portion of the utterance of the user does not match the acoustic profile for at least one of the target utterances, then the utterance training system will not provide a responsive effect. Additionally, in some implementations, if the utterance training system 100 is unsure or not sufficiently sure that the utterance provided by the user's voice matches a target utterances, then a responsive effect will not occur.

Figure 7:
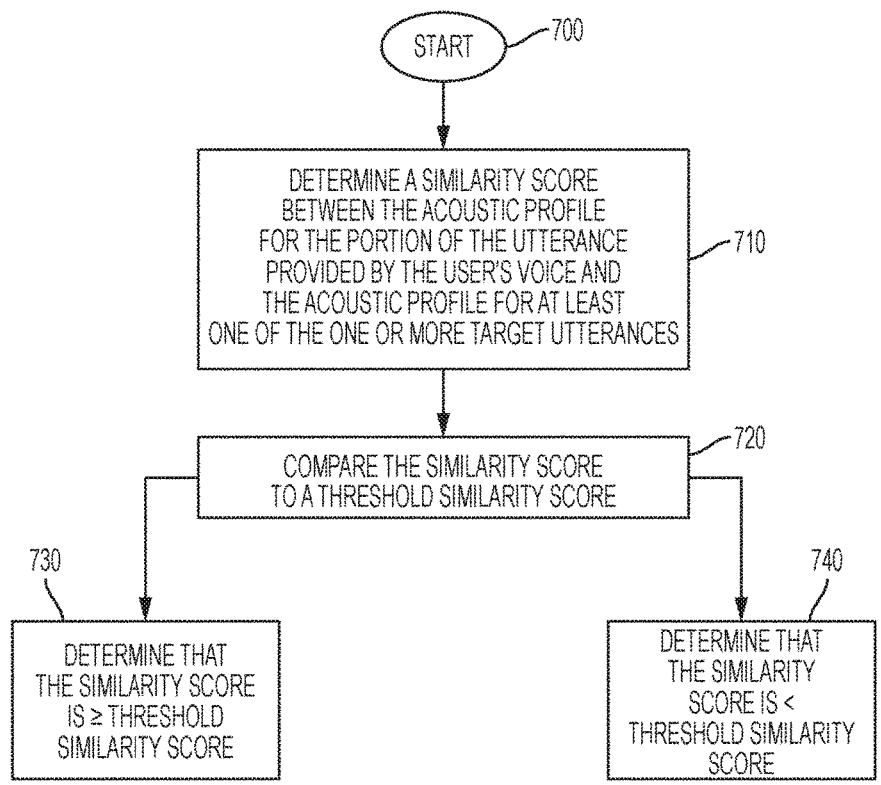
FIG. 7 is a flowchart that generally illustrates various steps executed by the Utterance Training Module to provide an analysis of an acoustic profile of a user based on a similarly score, according to a particular embodiment.

FIG. 7 is a flowchart that generally illustrates various steps executed by the utterance training module 400 to provide an analysis of an acoustic profile of a user based on a similarity score, according to a particular embodiment. The process begins at step 710 where the utterance training system 100 determines a similarity score between the acoustic profile for the portion of the utterance provided by the user's voice and the acoustic profile for at least one of the one or more target utterances. The similarity score may be based on any type of comparison between the acoustic profile for the user's utterance and the acoustic profile for the target utterances. For example, in some implementations, the system may perform a mapping between the sound data, or sound waves, of the user's utterances and those of the target utterances. The similarity score may be based on a scale (e.g., 1 to 100), identifying a certain number of similarities or differences (e.g., a certain number of similarities or differences in the sound waves for the user's utterances and the target utterances), or any other scoring method.

At step 720, the utterance training system 100 compares the determined similarity score to a threshold similarity score. The threshold similarity score may be provided by the user, or the utterance training system 100 may set the threshold similarity score. The threshold similarity score may be set at a low threshold to initiate the responsive effect more often, but likely initiate a greater number of false positives (e.g., provide the responsive effect when the user did not utter a target utterance). Contrarily, the threshold similarity score may be set at a high threshold to prevent the initiation of the responsive effect more often, but this may provide a greater number of false negatives (e.g., not provide the responsive effect when the user did in fact utter a target utterance). This similarity score may be changed within the target utterance system 100 by the user or automatically by the target utterance system 100.

At step 730, the utterance training system 100 determines that the similarity score meets the threshold similarity score, and, in response, provides the responsive effect. If, in response to comparing the similarity score to the threshold similarity score, the similarity score does not meet the threshold similarity score, then, at step 740, the utterance training system 100 does not provide the responsive effect.

Figure 8:
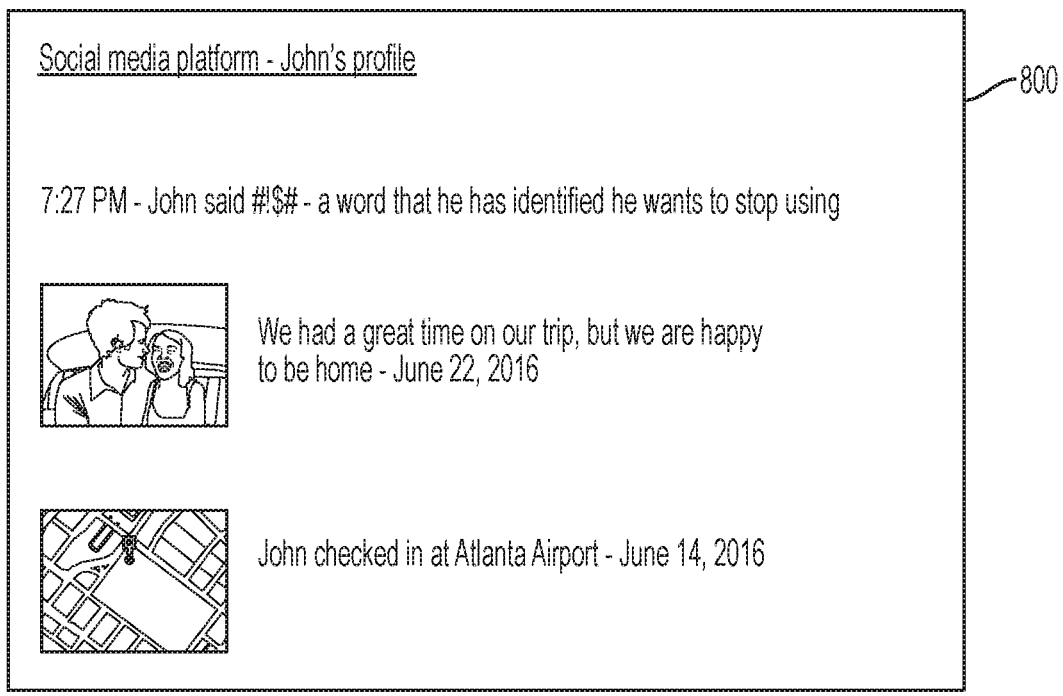
FIG. 8 is an example screen shots of a graphical user interface of a responsive effect provided by a system according to a certain embodiment.

FIG. 8 is an example screen shots of a graphical user interface 800 of a responsive effect provided by a target utterance system according to a certain embodiment. FIG. 8 is an example of the responsive effect of creating a public disclosure to communicate information indicating that the user uttered one or more of the target utterances. Specifically, FIG. 8 is an example of automatically creating a social media post indicating that the user stated a particular target utterance (e.g., as a responsive effect). The utterance training system 100 may use information that is provided by the user related to a social media platform of the user. Access to this information may be allowed or disallowed by the user. The utterance training system 100 may use the target utterance server 130 and/or portable computer 120 of the user to access the social media platform of the user. Upon the utterance training system 100 detecting that the user stated a target utterance, the utterance training system 100 may provide a responsive effect that accesses the user's social media platform and provides a post, or other content, indicating that the user stated a particular utterance. In some implementations, the post or content may not indicate the particular utterance that the user stated, but it may, for example, state that the user stated an utterance that the user is either attempting to use less frequently or more frequently. As seen in FIG. 8, the system may automatically create the post and add the post to the user's profile at the social media platform. In other implementations, the system may prompt the user to approve the post or content prior to presentation at the user's social media platform.

CONCLUSION

Various embodiments may include additional features beyond those described above. Many modifications and other embodiments of the invention will come to mind to one skilled in the art to which this invention pertains, having the benefit of the teaching presented in the foregoing descriptions and the associated drawings. Therefore, it is to be understood that the invention is not to be limited to the specific embodiments disclosed and that modifications and other embodiments are intended to be included within the scope of the appended claims. It should also be specifically understood that any steps executed within a set of computer-executable instructions would, at least in various embodiments, be executed by at least one computer processor associated with memory. Although specific terms are employed herein, they are used in a generic and descriptive sense only and not for the purposes of limitation.

I claim:

1. A wearable utterance training system, comprising:
at least one processor and memory that stores a plurality of target utterances; and
a wearable utterance training device, comprising:
a data collection device that comprises at least one microphone configured for capturing sound data; and
communication hardware for communicating the captured sound data to the at least one processor, wherein:
the at least one processor is configured for:
receiving a user selection of a plurality of user-specified target utterances;
identifying one or more utterances of a user over a period of time;
comparing the one or more utterances of the user identified over the period of time to the plurality of user-specified target utterances;
determining that at least a particular one of the one or more utterances of the user over the period of time is one of the plurality of user-specified target utterances stored in the processor memory; and
in response to determining that the particular one of the one or more utterances of the user over the period of time is one of the plurality of user-specified target utterances stored in the processor memory, automatically, in each instance of determining that the particular one of the one or more utterances of the user over the period of time is one of the plurality of user-specified target utterances, providing a responsive effect based on the at least one of the one or more utterances, wherein the responsive effect is selected from a group consisting of: (1) a positive responsive action configured to incentivize future use, by the user, of the particular one of the plurality of target utterances, and (2) a negative responsive action configured to discourage future use, by the user, of the particular one of the plurality of target utterances.

2. The wearable utterance training system of claim 1, wherein the at least one processor is further configured for, in response to determining that the particular one of the one or more utterances of the user over the period of time is one of the plurality of target utterances stored in the processor memory:
updating a number of times the user has uttered one of the plurality of user-specified target utterances; and
storing the number of times in the memory.

3. The wearable utterance training system of claim 1, wherein:
the wearable utterance training system further comprises a mobile computing device comprising at least one second processor;
the at least one processor is further configured for, in response to determining that the particular one of the one or more utterances of the user over the period of time is one of the plurality of user-specified target utterances stored in the processor memory, transmitting a notification of the particular one of the one or more utterances to the mobile computing device; and
the at least one second processor is configured for, in response to receiving the notification, providing the responsive effect.

4. The wearable utterance training system of claim 3, wherein the responsive effect is selected from a group consisting of:
initiating a transfer of money between an account associated with the user and a third party account; and
creating a public disclosure to communicate information indicating that the user uttered one of the plurality of user-specified target utterances.

5. The wearable utterance training device of claim 1, wherein the wearable utterance training device includes a stimulus component at least indirectly.

6. The wearable utterance training device of claim 5, wherein the responsive effect comprises causing the stimulus component to initiate an electrical shock intended for the user.

7. A non-transitory computer-readable medium storing computer executable instructions for:
receiving a user selection, by an utterance training system that includes a computing device, of one or more user-specified target utterances associated with a user, wherein the one or more user-specified target utterances are known to the user and the utterance training system includes at least a wearable device at least indirectly attached to the user and a processing device that is associated with the user and is in electronic communication with the wearable device, the wearable device being an electrical device;
storing, by the utterance training system, the one or more user-specified target utterances associated with the user;
monitoring, by the utterance training system that includes a microphone for capturing sound data, the user's utterances for a period of time;
determining, by the utterance training system, that at least a particular one of the user's utterances during the period of time is one of the one or more user-specified target utterances; and
in response to determining that the particular one of the user's utterances during the period of time is one of the one or more user-specified target utterances, automatically, in each instance of determining that the particular one of the one or more utterances of the user over the period of time is one of the one or more user-specified target utterances, causing, by the utterance training system, a responsive effect to occur based on one at least one of the user's utterances, wherein the responsive effect is selected from a group consisting of: (1) a positive responsive action configured to incentivize future use, by the user, of the particular one of the plurality of target utterances, and (2) a negative responsive action configured to discourage future use, by the user, of the particular one of the plurality of target utterances.

8. The non-transitory computer readable medium of claim 7, wherein receiving the user selection of the one or more user-specified target utterances from the user comprises receiving the one or more user-specified target utterances in response to an input selected from a group consisting of: (1) voice input to the utterance training system by the user; and (2) text input to the utterance training system by the user.

9. The non-transitory computer readable medium of claim 7, wherein monitoring the user's utterances for the period of time further comprises:
detecting, by the utterance training system, sound data for the period of time;
determining, by the wearable device, that a portion of the sound data comprises an utterance provided by a human voice; and determining, by the wearable device, that the portion of the utterance provided by the human voice comprises the user's voice.

10. The non-transitory computer readable medium of claim 9, further storing computer-executable instructions for:
converting, by the utterance training system, the portion of the utterance that was determined to be the user's voice to utterance text;
comparing, by the utterance training system, the utterance text of the user's voice to text of the one or more user-specified target utterances; and
determining, by the utterance training system, whether the utterance text matches the text of the one or more user-specified target utterances.

11. The non-transitory computer readable medium of claim 9, further storing computer-executable instructions for:
creating, by the utterance training system, an acoustic profile for the portion of the utterance provided by the user's voice;
comparing, by the utterance training system, the acoustic profile for the portion of the utterance provided by the user's voice to an acoustic profile created for each of the one or more user-specified target utterances; and
determining, by the utterance training system, whether the acoustic profile for the portion of the utterance provided by the user's voice matches the acoustic profile for at least one of the one or more user-specified target utterances.

12. The non-transitory computer readable medium of claim 11, wherein determining that the acoustic profile for the portion of the utterance provided by the user's voice matches the acoustic profile for at least one of the one or more identified utterances further comprises:
determining, by the utterance training system, a similarity score between the acoustic profile for the portion of the utterance provided by the user's voice and the acoustic profile for at least one of the one or more user-specified target utterances;
comparing, by the utterance training system, the similarity score to a threshold similarity score; and
determining, by the utterance training system, whether the similarity score meets the threshold similarity score.

13. The non-transitory computer readable medium of claim 9, wherein in response to determining, by the wearable device, that the portion of the utterance provided by the human voice was not the user's voice, disabling the responsive effect from occurring.

14. The non-transitory computer readable medium of claim 7, wherein the wearable device is selected from a group consisting of at least a necklace, a bracelet, a collar, a belt, a headband, an earring, a ring, a clasp, and a skin clamp.

15. The non-transitory computer readable medium of claim 7, wherein the responsive effect comprises an electrical vibration provided by the wearable device of the utterance training system to the user.

16. The non-transitory computer readable medium of claim 7, wherein the responsive effect is selected from a group consisting of:
a. incrementing, by the utterance training system, a number of times the user's utterances is one or more user-specified target utterances;
b. initiating, by the utterance training system, a transfer of money between an account associated with the user and a third party account;
c. creating, by the utterance training system, a public disclosure to communicate information indicating that the user uttered one or more of the user-specified target utterances; and
d. playing, by the utterance training system, a recording of the user's utterance that is the one or more target utterances.

17. The non-transitory computer readable medium of claim 7, wherein monitoring the user's utterances over a period of time further comprises:
activating a microphone of a user device associated with the user; and
capturing sound data that is detected by the microphone of the user device associated with the user.

18. A computer implemented method, comprising:
receiving a user selection, by a utterance training system that is a computing device, of one or more user-specified target utterances associated with a user, wherein the one or more user-specified target utterances are known to the user and the utterance training system includes at least a wearable device at least indirectly attached to the user and a processing device that is associated with the user and is in electronic communication with the wearable device, the wearable device being an electrical device;
storing, by the utterance training system, the one or more user-specified target utterances associated with the user;
continuously monitoring, by the utterance training system, the user's utterances for a period of time;
determining, by the utterance training system, that at least a particular one of the user's utterances over the period of time is one of the one or more user-specified target utterances; and
in response to determining that the particular one of the user's utterances over the period of time is one of the one or more target utterances, automatically, in each instance of determining that the particular one of the one or more utterances of the user over the period of time is one of the one or more user-specified target utterances, taking an action that is a negative responsive action configured to discourage use, by the user, of the particular one of the plurality of target utterances, wherein the action is selected from a group consisting of:
a. initiating, by the utterance training system, a transfer of money between an account associated with the user and a third party account;
b. creating, by the utterance training system, a public disclosure to communicate information indicating that the user uttered one or more of the target utterances; and
c. playing, by the utterance training system, a sound.

19. The computer implemented method of claim 18, further comprising taking an action substantially immediately in response to that at least one of the user's utterances over the period of time is one of the one or more user-specified target utterances.

* * * * *